June 15, 1965 L. E. McDUFF 3,188,738
CUTTING TOOL
Filed Dec. 7, 1962

INVENTOR.
LEON E. McDUFF
BY
John A. McKinney
ATTORNEY

3,188,738
CUTTING TOOL
Leon E. McDuff, Corona, Calif., assignor to Johns-Manville Corporation, New York, N.Y., a corporation of New York
Filed Dec. 7, 1962, Ser. No. 243,090
1 Claim. (Cl. 30—289)

This invention relates to the joining of two pieces of preformed tubular articles such as glass fiber air ducts and more specifically concerns a tool for making a simple slip fit joint on such ducts in the field.

The advent of glass fibers has brought about substantial changes in many industries and particularly noteworthy is the air duct industry. Further, with the recent developments in resin binders, molding processes, and jacketing films for such fiber ducts, the significance of such has been emphasized.

While a method has been developed for use during the process of manufacturing the fiber glass ducts to provide appropriate male and female ends to permit a slip joint between two ducts, installation conditions sometimes limit the use of standard size ducts. It is therefore sometimes necessary to make similar joints in the field on a lesser length of duct and for this and similar applications, various types of cutting instruments have been developed. However, to date no one instrument has been developed which will satisfactorily and easily provide for the cutting and removal of portions of the ends of the ducts to provide the slip joint elements. By the instant invention such a tool has been provided.

Specifically, a U-shaped unit designed for ease of holding during operation is provided with an inwardly exposed cutting edge. The U-shaped tool is of such dimension as to fit over the end of a fibrous duct and the exposure of the blade may be varied so as to permit the cutting away of a portion of the wall thickness. By employing such a cutting tool, end portions of the duct may be removed so as to provide a duct with correspondingly reduced thicknesses on either side the inner or outer portion of the duct, whereby mateable male and female ends are provided.

*Objects*

It was therefore a main object of the present invention to provide a cutting tool which is adapted to fit the hand of the operator in a highly convenient and comfortable manner for facilitating removal of portions of fibrous air ducts so as to permit in-the-field slip joining of such ducts.

It was another object of this invention to provide a cutting tool which could be used in other applications similar to in-the-field cutting of fibrous pipes.

Other objects and further scope of applicability of the present invention will become apparent from the detailed description given hereinafter, the preferred embodiment of which has been illustrated in the accompanying drawing by way of example only, wherein.

*Detailed description of the invention*

Figure 3:
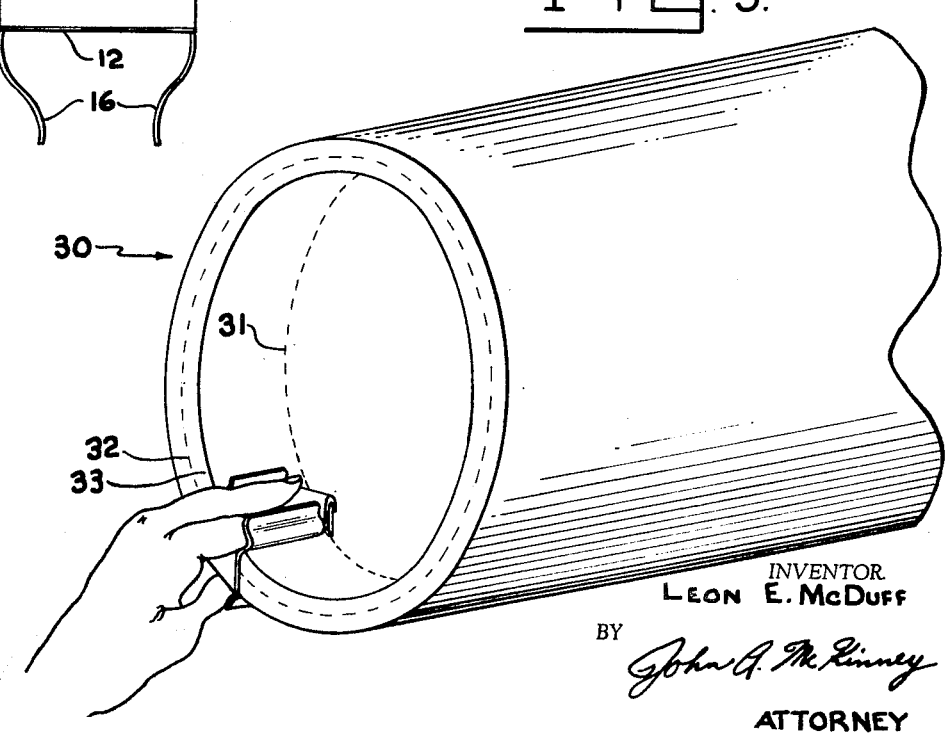
FIGURE 3 is a perspective view showing the invention in use.

With continuing reference to the accompanying drawings wherein like reference numerals designate similar parts throughout the various views, this invention consists of a U-shaped cutting tool 10 having legs 11 and 12 and base 13 wherein the legs of the U may be fitted over the end wall of a piece of formed fibrous duct or similar article to be cut, as shown in FIGURE 3.

Both legs 11 and 12 of the U have a pair of outturned leg flanges 15 and 16, respectively, running with the length of the legs in such a manner that the operator's fingers may be inserted therebetween to hold the tool in operation and not permitted to slide off. Additionally, the incorporation of such leg flanges permits the application of lateral pressure for moving the cutter around the circumference in close contact with the duct. Leg 11 is additionally provided with an inclined end flange 18 having a generally triangular shape, affixed perpendicular to the length of said leg and at the end 17 of said leg.

The stop edge of this triangularly shaped flange is folded over so as to form an inturned holding recess 19, faced away from base 13, for the reception and retention of a blade 22 such as a razor blade or the like. The holding recess 19 may be of a larger size to permit the reception of reinforcement 23 for rigidifying the blade 22.

Figure 1:
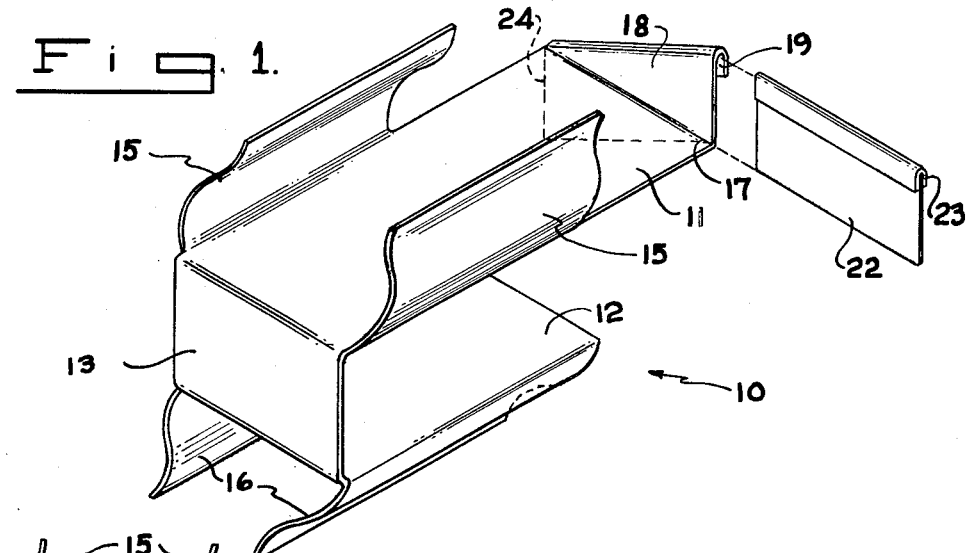
FIGURE 1 is a perspective view of the invention with the blade removed.
Figure 2:
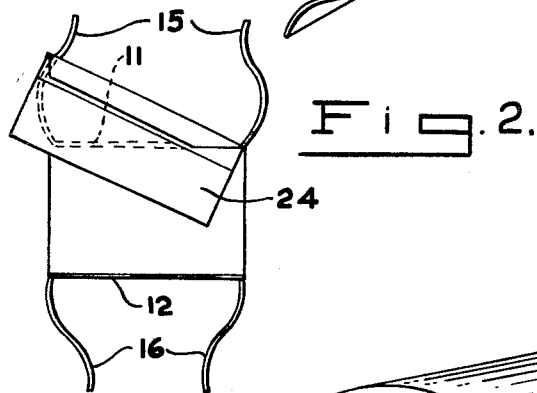
FIGURE 2 is an end view of the invention viewed from the open or blade receiving end of the tool as shown in FIGURE 1.

As shown in FIGURE 2, the end flange 18 is so designed that when blade 22 is inserted therein a portion 24 of the blade will extend below the edge of leg 11. By sliding the reinforcement 23 and blade 22 lengthwise into recess 19 and transversely of leg 11, to a greater or less extent, or by altering the design and/or the inclination of the recess, the extent of the exposure of portion 24 may be varied with the consequential variation in the cutting depth of the duct.

In the operation of the instrument, as shown in FIGURE 3, the user's index and middle fingers may be inserted on leg 11 between leg flanges 15 and the thumb inserted below leg 12 between leg flanges 16. With blade 22 inserted in recess 19, the tool is ready for use. The extended section 24 of the blade 2 is located so that when the inwardly facing surface of the leg 11 of the tool is held in intimate contact with either the inner or outer surface of the duct 30 adjacent an end thereof and the inner surface of base 13 is held against the corresponding end surface of the duct and the tool then slid around the full circumference of the duct, a cut 31 is made around the inner, or outer, circumference at a uniform depth equal to the depth of the exposed razor blade. If this depth is equal to one half the wall thickness, as illustrated by line 32, and with the duct being of a laminated construction, the half wall section 33 of the duct, delineated by the half wall thickness cut, may be removed, leaving the end of the duct with a half wall thickness depth on the outer portion of the duct.

When adjoining pieces are cut one on the outside and the other on the inside, slip joint sections are the result and the two pieces may be joined together, the male end of one being snugly inserted inside the female end of the other. The parts then may be held in place by means of their snug fit or, more preferably, by conventional pressure-sensitive tape or other fastening devices which not only hold the sections together but help seal the joint between two joined sections.

It is believed that the above provides a complete description of the invention in such manner as to distinguish it from other inventions and from what is old and provides a description of the best mode contemplated for carrying out the invention and thereby complies with the patent statutes.

It is to be understood that variations and modifications of the invention as illustrated by specific examples herein, may be made without departing from the spirit of the invention. It is also understood that the scope of the invention is not to be interpreted as limited to the specific embodiments disclosed herein but only in accordance with the appended claim when read in light of the foregoing description.

What I claim is:

A cutting tool comprising, a one piece U-shaped body having two generally flat and substantially parallel legs and a generally flat base joining opposed ends of said legs, whereby the relative position of said legs is fixed, said legs having spaced apart outturned fixed flanges extended for at least a portion of the edges of said legs and defining finger retaining means, one of said legs additionally having a stationary outturned flange at the open end of said leg, the top edge of said flange being inclined from one lengthwise edge of said leg to the other, said inclined end being inturned away from the closed end of said body and providing a holding recess for a cutting blade, and a cutting blade maintained in said recess with its cutting edge partially extending inwardly of said leg toward the open end of said U-shaped body.

References Cited by the Examiner

UNITED STATES PATENTS

| | | | |
|---|---|---|---|
| 207,597 | 9/78 | Elliott | 30—293 |
| 401,154 | 4/89 | Gillette et al. | 285—330 X |
| 427,461 | 5/90 | Comstock | 30—293 |
| 467,500 | 1/92 | Fenwick | 30—103 |
| 693,660 | 2/02 | Lamont | 30—294 X |
| 1,028,870 | 6/12 | Fletcher | 30—103 |
| 1,201,317 | 10/16 | Lishawa | 30—291 |
| 1,601,560 | 9/26 | Codman | 30—253 X |
| 2,641,834 | 6/53 | Bobrowski et al. | 30—293 X |
| 2,791,027 | 5/57 | Davidson | 30—320 |
| 2,835,031 | 5/58 | Cook | 30—91.3 |

WILLIAM FELDMAN, *Primary Examiner.*

MILTON S. MEHR, *Examiner.*